US012747805B2

(12) United States Patent
Reese et al.

(10) Patent No.: US 12,747,805 B2
(45) Date of Patent: Sep. 29, 2026

(54) ROTOR TUBE ASSEMBLY FOR A FLUID VALVE ACTUATOR AND METHOD FOR ASSEMBLING A ROTOR TUBE ASSEMBLY

(71) Applicant: Danfoss A/S, Nordborg (DK)

(72) Inventors: Birthe Nissen Reese, Nordborg (DK); Sigurd Larsen, Kruså (DK); Nicolai Risom Windelborg, Nordborg (DK)

(73) Assignee: DANFOSS A/S, Nordborg (DK)

( * ) Notice: Subject to any disclaimer, the term of this patent is extended or adjusted under 35 U.S.C. 154(b) by 45 days.

(21) Appl. No.: 18/837,784

(22) PCT Filed: Dec. 30, 2022

(86) PCT No.: PCT/EP2022/088058
§ 371 (c)(1),
(2) Date: Aug. 12, 2024

(87) PCT Pub. No.: WO2023/151858
PCT Pub. Date: Aug. 17, 2023

(65) Prior Publication Data

US 2025/0155045 A1 May 15, 2025

(30) Foreign Application Priority Data

Feb. 14, 2022 (DK) .............................. PA202200117

(51) Int. Cl.
*F16K 31/04* (2006.01)

(52) U.S. Cl.
CPC .................................. *F16K 31/047* (2013.01)

(58) Field of Classification Search
CPC .......... F16K 1/02; F16K 1/54; F16K 27/0254; F16K 27/029; F16K 31/047; F16K 31/508
See application file for complete search history.

(56) References Cited

U.S. PATENT DOCUMENTS 3,051,858 A 8/1962 McCown et al.
6,923,427 B2 * 8/2005 Yonezawa ............ F16K 31/105 251/77

(Continued)

FOREIGN PATENT DOCUMENTS

CN 110296265 A 10/2019
CN 111365479 A 7/2020

(Continued)

OTHER PUBLICATIONS

International Search Report mailed Apr. 13, 2023, in connection with corresponding International Application No. PCT/EP2022/088058; 3 pages.

*Primary Examiner* — Eric Keasel
(74) *Attorney, Agent, or Firm* — McCormick, Paulding & Huber PLLC

(57) ABSTRACT

A rotor tube assembly for a fluid valve actuator including a bearing housing assembly, a lead screw with a bottom shoulder, a rotor sleeve assembly with a non-block assembly, a bushing and a rotor tube. The lead screw is provided at least partially inside the bearing housing assembly, the rotor sleeve assembly, the bushing and the rotor tube. The bottom shoulder abuts the bearing housing assembly and the lead screw includes a bottom threaded portion on one side of the bottom shoulder and on the other side of the bottom shoulder and in this given order a bottom coupling portion for coupling the bearing housing assembly to the lead screw, a central coupling portion for coupling the rotor sleeve assembly to the lead screw, and an upper coupling portion for coupling the bushing to the lead screw. The bottom shoulder has a larger outer diameter than the coupling portions, the bottom coupling portion has a larger outer diameter than or the same diameter as the central coupling portion and the upper coupling portion has a smaller diameter than or the same diameter as the bottom coupling (Continued)

portion and the central coupling portion. The disclosure is also directed at a method for assembling a rotor tube assembly.

21 Claims, 4 Drawing Sheets

(56) References Cited

U.S. PATENT DOCUMENTS

| | | | | |
|---|---|---|---|---|
| 8,297,588 | B2 * | 10/2012 | Ohuchi | F25B 41/34 251/129.13 |
| 9,765,900 | B2 * | 9/2017 | Arai | F16H 25/20 |
| 10,161,540 | B2 * | 12/2018 | Boch | F16K 31/508 |
| 10,352,467 | B2 | 7/2019 | Lv et al. | |
| 11,274,766 | B2 * | 3/2022 | Lv | F25B 41/35 |
| 2018/0119840 | A1 | 5/2018 | Hishiya | |
| 2020/0340596 | A1 | 10/2020 | Lv et al. | |
| 2021/0172543 | A1 | 6/2021 | Lv et al. | |

FOREIGN PATENT DOCUMENTS

| | | | |
|---|---|---|---|
| CN | 110094525 | B | 7/2021 |
| EP | 3671070 | A1 | 6/2020 |
| EP | 3671072 | A1 | 6/2020 |
| EP | 3671073 | A1 | 6/2020 |
| EP | 3672030 | A1 | 6/2020 |
| WO | 2019179518 | A1 | 9/2019 |

* cited by examiner

C(10:1)
E(10:1)
D-D(5:1)
E
65
62
64
2
63
66
18
11
8

ROTOR TUBE ASSEMBLY FOR A FLUID VALVE ACTUATOR AND METHOD FOR ASSEMBLING A ROTOR TUBE ASSEMBLY

CROSS-REFERENCE TO RELATED APPLICATIONS

This application is a National Stage application of International Patent Application No. PCT/EP2022/088058, filed on Dec. 30, 2022, which claims priority to Danish Patent Application No. PA202200117, filed on Feb. 14, 2022, each of which is hereby incorporated by reference in its entirety.

TECHNICAL FIELD

The present invention pertains to a rotor tube assembly for a fluid valve actuator.

BACKGROUND

Rotor tube assemblies for fluid valve actuators are known from the art. They combine rotor components of the actuator and some coupling means for coupling the rotor to a fluid valve. The components of the rotor tube assembly are provided in a tube, which provides a barrier between the rotor and the stator of the actuator.

The components of known rotor tube assemblies have to be positioned precisely and intricately with respect to each other during the manufacturing of the rotor tube assembly. Furthermore, particular joining methods for joining the components may additionally increase the complexity of the manufacture of the rotor tube assembly. Because of these problems, the costs of known rotor tube assemblies might be elevated.

SUMMARY

The aim of the present invention is to overcome the above outlined problems and to provide an improved rotor tube assembly and an improved method for assembling a rotor tube assembly. This aim is reached by a rotor tube assembly according to claim 1 and a method for assembling a rotor tube assembly according to claim 10. Preferable embodiments of the invention are subject to the dependent claim.

According to the invention, a rotor tube assembly for a fluid valve actuator is provided. The rotor tube assembly is insertable into a stator assembly of the fluid valve actuator, such that a complete actuator can be provided. The actuator may be connected to a fluid valve for actuating said fluid valve. The rotor tube assembly comprises a bearing housing assembly, a lead screw with a bottom shoulder, a rotor sleeve assembly with a non-block assembly, a bushing and a rotor tube, wherein the lead screw is provided at least partially inside the bearing housing assembly, the rotor sleeve assembly, the bushing and the rotor tube, and wherein the bottom shoulder abuts the bearing housing assembly.

The lead screw comprises a bottom threaded portion on one side of the bottom shoulder and on the other side of the bottom shoulder and in this given order the following portions: a bottom coupling portion for coupling the bearing housing assembly to the lead screw, a central coupling portion for coupling the rotor sleeve assembly to the lead screw, and an upper coupling portion for coupling the bushing to the lead screw. The coupling portions may be external faces, in particular circumferential, cylindrical faces of the lead screw, which are in direct contact with the bearing housing assembly, the rotor sleeve assembly and the bushing, respectively.

According to the invention, the bottom shoulder has a larger outer diameter than the coupling portions, the bottom coupling portion has a larger outer diameter than or the same diameter as the central coupling portion and the upper coupling portion has a smaller diameter than or the same diameter as the bottom coupling portion and the central coupling portion.

The bottom shoulder does not have to be of a circular shape. The diameter of the bottom shoulder may therefore refer to the extension of the bottom shoulder in a radial direction.

The equal or decreasing diameters of the bottom shoulder and the coupling portions in a direction away from the threaded portion of the lead screw makes it possible to easily insert the lead screw into subsequent components of the rotor tube assembly, while making sure that the bearing housing abuts the bottom shoulder. Also, the relative positions of the coupling portions can be easily manufactured to be within precise distances with respect to each other. Thus, they facilitate the correct arrangement of the components of the rotor tube assembly.

In a preferred embodiment of the invention, a guiding portion between the bottom coupling portion and the central coupling portion is provided for guiding the rotor sleeve assembly, wherein preferably a central shoulder is provided between the bottom coupling portion and the guiding portion and/or an upper shoulder is provided between the guiding portion and the central coupling portion.

The shoulders may be provided as abutments for positioning components of the rotor sleeve assembly more precisely and with limited effort.

In another preferred embodiment of the invention, the lead screw is in contact with the rotor tube preferably only via the bushing and the bearing housing assembly and/or the bearing housing assembly is fixed to the lead screw by means of an inner stopper preferably press fit to the lead screw. The top of the lead screw may be its portion opposite its threaded portion. The top of the lead screw may thus be furthest inserted into the rotor tube. Generally, throughout the description, the top or uppermost portion of any component may be understood to be oriented towards the inside of the tube while the bottom or bottommost portion of any component may be oriented towards the opening of the tube. The only indirect contact between the screw and the rotor tube may be provided by the bushing and the bearing housing assembly.

In another preferred embodiment of the invention, the bottom shoulder is the widest portion of the lead screw and/or the rotor sleeve assembly is coupled to the lead screw via the non-block assembly, wherein the non-block assembly is preferably oriented away from the bearing housing assembly and towards the bushing. The bottom shoulder may be of an annular shape. Its diameter may the largest diameter of any lead screw portion. It may extend further in the radial direction than in the axial direction. Alternatively, the bottom shoulder may be of a non-annular shape. For example, the bottom shoulder may comprise one or more protrusions pointing radially outward of the lead screw. This protrusion may be of any suitable shape for abutting the bearing housing assembly.

Throughout the description, the axial direction may correspond to the longitudinal direction of the lead screw. The radial direction may correspond to the radial direction of the lead screw. The lead screw typically comprises at least some cylindrical portion from which the axial, radial and circumferential directions may be derived.

The non-block assembly is provided for unblocking the valve in a situation in which it has become stuck. In order to unblock the valve, the non-block assembly provides some play between parts of the rotor sleeve assembly and the lead screw. In particular, the non-block assembly enables some limited relative motion in a circumferential direction between the lead screw and at least some components of the rotor sleeve assembly. The circumferential direction may correspond to the circumferential direction of the lead screw.

In another preferred embodiment of the invention, the non-block assembly is press fit to the lead screw. The press fit may be the only means for securing the non-block assembly to the lead screw. The press fit may be provided at an end of the non-block assembly, which faces away from the threaded portion of the lead screw and towards the bushing.

In another preferred embodiment of the invention, the bearing housing assembly comprises a bearing housing, a bearing, an outer stopper and axial grooves for inserting a lead nut. Alternatively or additionally, a lead nut and a fixing member are provided for connecting the lead screw to a fluid valve. Clearly, the same lead nut may be part of the bearing housing assembly and may be connected to the fluid valve. The bearing housing may be positioned between the rotor sleeve assembly and the threaded portion of the lead screw. The bearing inside the bearing housing may be the only rolling bearing of the entire roller tube assembly. The outer stopper may be in close contact with an interior cylindrical face of the bearing housing. The axial grooves may extend between the bottom shoulder and a bottom-most face of the bearing housing.

In another preferred embodiment of the invention, the bearing housing comprises radially outward pointing protrusions and/or two portions of different outer diameters. The outer shape of the bearing housing may be thus chosen to better fix the bearing housing to the rotor tube. The different diameter portions make it possible to insert the bearing housing easier into the rotor tube while at the same time providing an external abutment for positioning the bearing housing precisely with respect to a corresponding internal abutment of the rotor tube.

In another preferred embodiment of the invention, the rotor tube comprises an opening and three axially spaced apart portions of decreasing internal diameters, wherein the bushing is inserted into the innermost portion of the smallest diameter and furthest away from the opening and/or the bearing housing assembly is inserted at least partially into the outermost portion of the largest diameter and closest to the opening. The rotor sleeve assembly may be inserted into the central portion of medium diameter. Each of the spaced apart portions may have a constant diameter throughout its length, such that diameter changes of the rotor tube are provided between the spaced apart portions.

In another preferred embodiment of the invention, the bushing and/or the bearing housing assembly comprise chamfered leading edges for facilitating their insertion into the rotor tube and/or that the non-block assembly is provided at least partially within the bushing. The chamfered leading edges may be provided at the extreme ends of the corresponding components and/or at some intermediate positions. The bushing may be of an at least partially u-shaped longitudinal section; therefore, at least parts of the non-block assembly may be positioned within said bushing, thereby reducing the overall size of the device.

The present invention is also directed at a method for assembling a rotor tube assembly. The method comprises the steps of

- assembling a bearing housing assembly;
- assembling a rotor sleeve assembly;
- inserting a lead screw into the bearing housing assembly;
- coupling the lead screw to the bearing housing assembly;
- inserting the lead screw into the rotor sleeve assembly;
- coupling the rotor sleeve assembly to the lead screw;
- positioning a bushing into a rotor tube or onto the lead screw; and
- inserting the lead screw with the bearing housing assembly and the rotor sleeve assembly into the rotor tube.

The steps may be performed in a different order, if this is physically feasible. Steps such as assembling the bearing housing assembly and the rotor sleeve assembly may be combined with other steps such as inserting the lead screw into said assemblies. In a case in which the bushing is positioned onto the lead screw, the bushing is then inserted into the rotor tube together with the other components connected to the lead screw. In a case in which the bushing is positioned into the rotor tube, the lead screw is inserted into the bushing at the same time the lead screw is inserted into the rotor tube.

In a preferred embodiment of the invention, the method comprises the step of connecting a lead nut and a fixing member to the lead screw.

The assembled rotor tube assembly may comprise any combination of the features described above. Of particular relevance may be features which enable or facilitate the assembly of the rotor tube assembly, in particular in the order given above.

BRIEF DESCRIPTION OF THE DRAWINGS

Further details and advantages of the invention will be described with reference to the embodiments shown in the figures. The figures show.

DETAILED DESCRIPTION

Figures 1A, 1B, 1C:
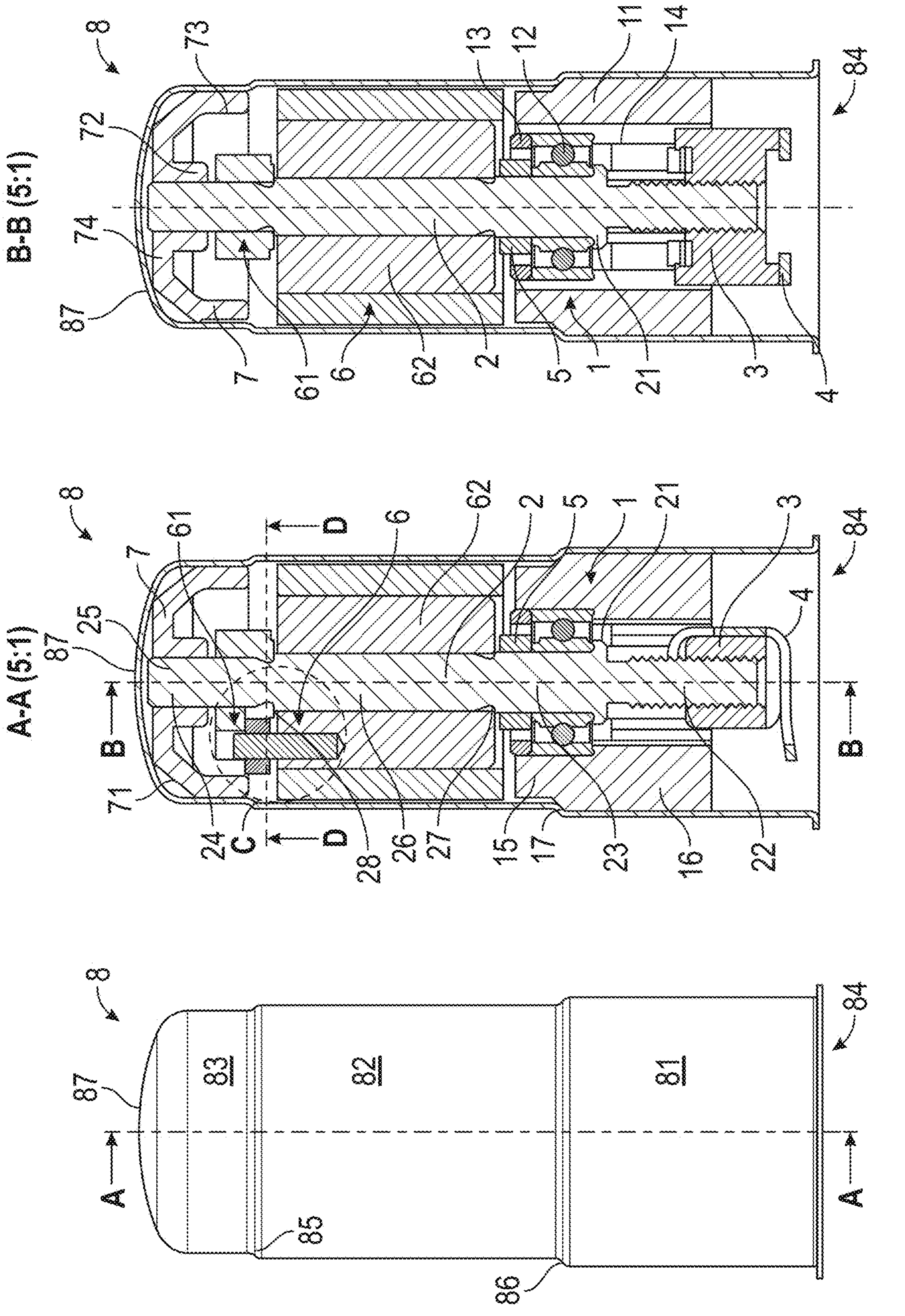
FIG. 1*a*: external view on tube of the rotor tube assembly.
FIGS. 1*b* and 1*c*: two longitudinal section views of the rotor tube assembly set at different angles.

FIG. 1*a* shows an external view of tube 8 of an embodiment of the present invention's rotor tube assembly. The rotor tube 8 may comprises an opening 84 at its bottom and three axially spaced apart portions 81, 82, 83, wherein each portion 81, 82, 83 has a different internal diameter, the diameters decreasing from the opening 84 to the convex end 87 of the tube 8.

Each of the three spaced apart portions 81, 82, 83 may be of cylindrical shape, wherein the cylindrical portions may be connected by e.g. conical and/or step portions 85, 86 of decreasing diameters. The components of the rotor tube assembly are inserted into the tube 8 via the opening 84 and moved towards the closed opposite convex end 87 at the top of the tube 8.

The rotor tube assembly is used with a fluid valve actuator for actuating a fluid valve. The stator of the fluid valve actuator and the valve itself are not shown in the figures and may be of any suitable type. The rotor tube assembly is insertable into a stator assembly of the fluid valve actuator, such that a complete actuator can be provided.

As shown in the embodiment of FIGS. 1*b* and 1*c*, the rotor tube assembly comprises a bearing housing assembly 1, a lead screw 2 with a bottom shoulder 21, a rotor sleeve assembly 6 with a non-block assembly 61, a bushing 7 and the rotor tube 8.

The lead screw 2 is provided at least partially inside the bearing housing assembly 1, the rotor sleeve assembly 6, the bushing 7 and the rotor tube 8. The lead screw 2 is coupled to the rotor sleeve assembly 6 such that it can only be rotated but not moved or almost not moved in an axial direction of the lead screw 2. In particular, the rotor sleeve assembly may comprise at least two portions, which are not entirely rigidly fixed to each other. The coupling between these two portions may allow for some relative movement between the two portions in the axial direction of say one or a few tenths of a millimetre. One of the two portions may be a carrier rigidly fixed to the lead screw and the other one a rotor of the rotor sleeve assembly fixed to the carrier in a non-rigid way. The bottom shoulder 21 abuts the bearing housing assembly 1 for fixing one with respect to the other in an axial direction.

The lead screw 2 comprises a bottom threaded portion 22 on one side of the bottom shoulder 21 and on the other side of the bottom shoulder 21 and in this given order the following portions: a bottom coupling portion 23 for coupling the bearing housing assembly 1 to the lead screw 2, a central coupling portion 24 for coupling the rotor sleeve assembly 6 to the lead screw 2, and an upper coupling portion 25 for coupling the bushing 7 to the lead screw 2. The coupling of the bushing 7 to the lead screw may be such that the lead screw 2 may rotate with respect to the bushing.

The coupling portions may be or comprise external faces, in particular cylindrical, circumferential faces of the lead screw, which are in direct contact with the bearing housing assembly, the rotor sleeve assembly and the bushing, respectively. The diameters of the coupling portions 23, 24, 25 and of their respective counterparts, i.e. the bearing housing assembly 1, the rotor sleeve assembly 6 and the bushing 7 may be selected for a press fit and/or a shrink fit between the respective components.

The bushing 7 is positioned in the innermost portion 83 of the smallest diameter of the tube 8 and furthest away from the opening 84. There may be a gap provided between the bushing 7 and the top of the lead screw 2 on the one side and the top 87 of the tube 8 on the other side. The lead screw 2 may penetrate the bushing 7 in the axial direction. The bushing 7 may comprise an internal cylindrical portion 72 for contacting the lead screw 2 and an external cylindrical portion 73 for contacting the tube 8. The internal and external cylindrical portions 72, 73 may be concentric with respect to each other and/or may be connected to each other by a chamfered leading edge 71 and an annular flat portion 74. There may be a toroidal hollow space within the bushing 7 for accommodating parts of the non-block assembly 61.

The bearing housing assembly 1 is inserted at least partially into the outermost portion 81 of the largest diameter and closest to the opening 84. The bearing housing assembly 1 is press fit into the outermost portion 81 of the tube 8 and may fix the contents of the tube 8 within said tube 8 in an axial direction.

The bottom shoulder 21 has a larger outer diameter than the coupling portions 23, 24, 25. This facilitates the insertion of the lead screw 2 into and the connection to consecutive components of the rotor tube assembly.

The bottom coupling portion 23 has a larger outer diameter than or the same diameter as the central coupling portion 24. It is therefore possible to slide the bearing housing assembly onto the lead screw 2 all way from the top of the lead screw 2 to the bottom shoulder 21 and the bottom coupling portion 23. The upper coupling portion 25 has a smaller diameter than or the same diameter as the bottom coupling portion 23 and the central coupling portion 24.

The equal or decreasing diameter of the bottom shoulder 21 and the coupling portions in a direction away from the threaded portion of the lead screw makes it possible to easily insert the lead screw into subsequent components of the rotor tube assembly. Also, the relative positions of the coupling portions can be easily manufactured to be within precise distances with respect to each other. Thus, they facilitate the correct arrangement of the components of the rotor tube assembly.

A guiding portion 26 between the bottom coupling portion 23 and the central coupling portion 24 is provided for guiding the rotor sleeve assembly 6, such that the rotor sleeve assembly 6 can rotate around the guiding portion 26 when the actuator is turning. A central shoulder 27 is provided between the bottom coupling portion 23 and the guiding portion 26 for abutting the rotor sleeve assembly 6 at a predefined axial position. In particular, a rotor 62 or rather a radially inner part of the rotor 62 may abut the central shoulder 27. An upper shoulder 28 is provided between the guiding portion 26 and the central coupling portion 24 for abutting the non-block assembly 61. The non-block assembly 61 may be oriented away from the bearing housing assembly 1 and towards the bushing 7. The rotor sleeve assembly 6 is coupled to the lead screw 2 via the non-block assembly 61.

The non-block assembly 61 may be provided at least partially above the upper shoulder 28 while the remainder of the rotor sleeve assembly 6 is provided at and/or below the upper shoulder 28. The shoulders 21, 27, 28 may comprise flat surfaces, in particular circular surfaces extending in a radial direction only. Adjacent to said flat surfaces a notch may be provided extending in both, a radial and an axial direction. The shoulders 21, 27, 28 may be provided as abutments for positioning components of the rotor sleeve assembly more precisely and with limited effort.

The lead screw 2 is in contact with the rotor tube 8 preferably only via the bushing 7 and the bearing housing assembly 1. The bearing housing assembly 1 is fixed to the lead screw 2 by means of an inner stopper 5 preferably press fit to the lead screw 2. The top of the lead screw 2 may be its portion opposite its threaded portion 22. The top of the lead screw 2 may thus be furthest inserted into the rotor tube 8, without contacting the rotor tube 8. The tube 8 may comprise a convex end 87 opposite its opening 84. The only indirect contact between the lead screw 2 and the rotor tube 8 may be provided by the bushing 7 and the bearing housing assembly 1.

The bearing housing assembly 1 comprises a bearing housing 11, a bearing 12 within the bearing housing 1 and an outer stopper 13 for fixing the bearing 12 to the bearing housing 11. Axial grooves 14 are provided at a bottom interior portion of the bearing housing 11.

The axial grooves 14 are provided for inserting and guiding a lead nut 3 into the bearing housing 11 such that it cannot rotate with respect to the bearing housing 11. The axial grooves 14 may extend between a bottom part of the bearing housing 11 and the bottom shoulder 21.

A fixing member 4 such as a spring clip may be provided for connecting the lead screw 2 to a fluid valve not shown in the figure. The fixing member 4 may be shaped to contact a bottom facing and an upward facing face of the nut 3 simultaneously, it may be C-shaped.

The bearing housing 11 may be positioned between the rotor sleeve assembly 6 and the threaded portion 22 of the lead screw 2. The bearing 12 inside the bearing housing 11 may be the only rolling bearing of the entire rotor tube assembly. It may contact an inner cylindrical wall portion of the bearing housing 11 and the bottom shoulder 21. The outer stopper 13 may be in close contact with the same or another interior cylindrical face of the bearing housing 11. The axial grooves 14 may extend between the bottom shoulder 21 and a bottom face of the bearing housing 11.

The bearing housing 11 comprises two portions 15, 16 of different outer diameters. The bottom portion 16 may have a larger diameter than the upper portion 15. The upper portion 15 may be significantly shorter, e.g. 3-6 times shorter than the bottom portion 16. The outer diameter of the upper portion 15 may be smaller than the inner diameter of the central spaced apart portion 82 of the tube 8, such that an annular gap is provided between the central spaced apart portion 82 and the upper portion 15 of the bearing housing 11.

The outer shape of the bearing housing 11 may be thus chosen to better fix the bearing housing 11 to the rotor tube 8. The different diameter portions 15, 16 make it possible to insert the bearing housing 11 easily into the rotor tube 8 while at the same time providing an external abutment for positioning the bearing housing 11 precisely with a corresponding internal abutment of the rotor tube 8.

The bushing 7 and the bearing housing assembly 1, or more particularly, the bearing housing 11, comprise chamfered leading edges 71, 17 for facilitating the insertion of the respective parts into the rotor tube 8. The leading edge 17 of the bearing housing 11 may be provided between the two different diameter portions 15, 16. The leading edge 71 of the bushing may be provided at an uppermost portion of the bushing 7. The chamfered leading edges 71, 17 may therefore be provided at the extreme ends of the corresponding components and/or at some intermediate positions. The bearing housing 11 may comprise some additional leading edge at its uppermost position.

The bushing 7 may be of an at least partially u-shaped longitudinal section. At least parts of the non-block assembly 61 may be positioned within the bushing 7, thereby reducing the overall size of the device.

The bottom shoulder 21 may be the widest portion of the lead screw 2. The bottom shoulder 21 may be of an annular shape. Its diameter may be the largest diameter of any lead screw 2 portion. It may extend further in the radial direction than in the axial direction. All assembly steps for assembling the rotor tube assembly may therefore be performed such that components at both sides of the bottom shoulder 21 are connected to the lead screw 2 in the order defined by their distance from the bottom shoulder 21 in the readily assembled state. This means that components closest to the bottom shoulder 21, such as the bearing housing assembly 1 and a nut 3 are connected prior to components further away from the bottom shoulder 21, such as the rotor sleeve assembly 6. Typically, the nut 3 and the fixing member 4 will be mounted after all other parts have been inserted into tube 8. When mounting the nut 3 and the fixing member 4, the fixing member 4 can be first connected to the nut 3. Only then, both, the nut 3 and the fixing member 4 are connected simultaneously to the lead screw 2 via a threaded joint.

Figures 2A, 2B, 2C, 2D:
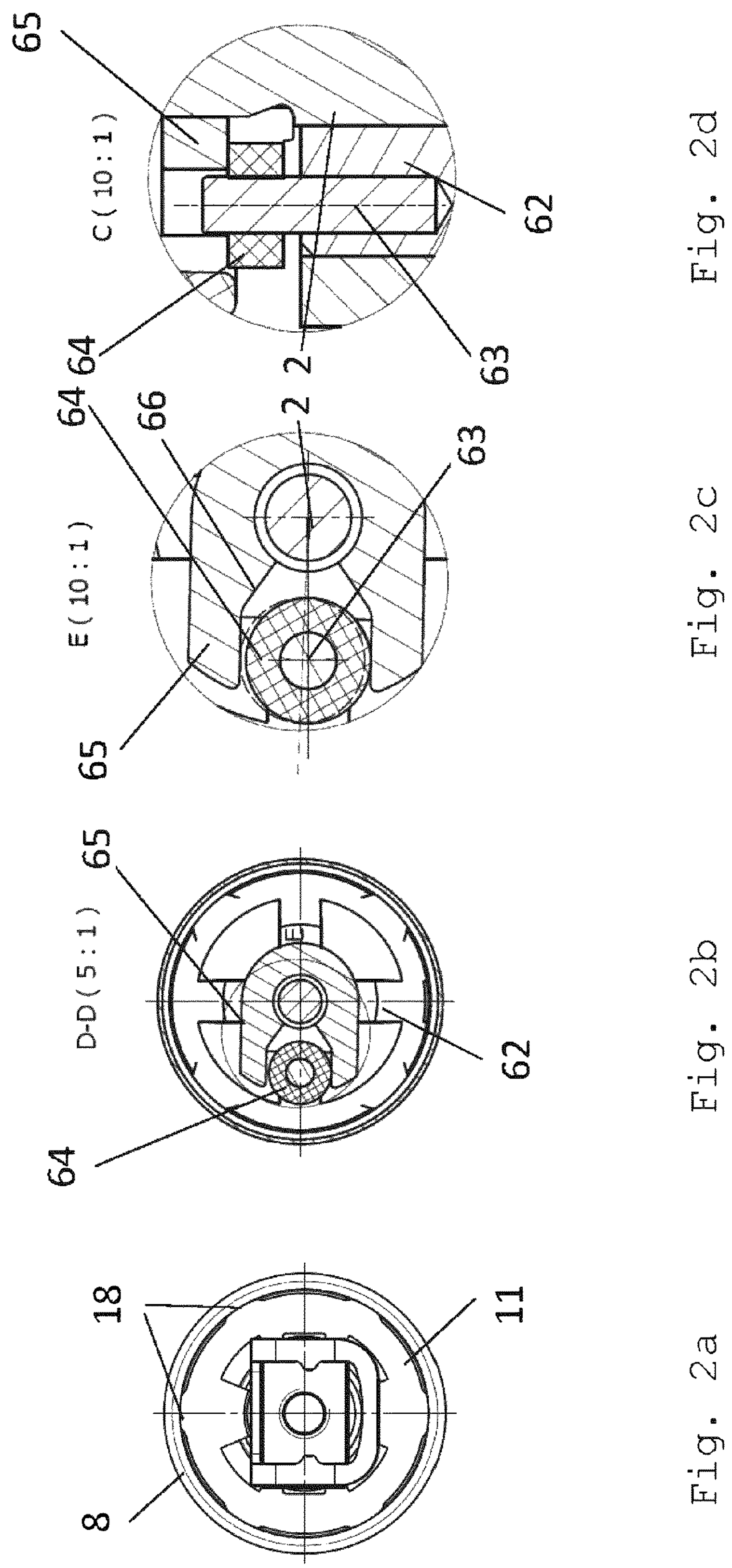
FIG. 2*a*: bottom view of the rotor tube assembly.
FIG. 2*b*: cross sectional view of the rotor tube assembly set at the non-block assembly.
FIG. 2*c*: detailed cross sectional view of the rotor tube assembly set at the non-block assembly.
FIG. 2*d*: detailed longitudinal sectional view of the rotor tube assembly set at the non-block assembly.

FIG. 2*a* is a bottom view of the rotor tube assembly. It shows radially outward pointing protrusions 18 of the bearing housing 11. The protrusions 18 are provided for better fixing the bearing housing 11 to the tube 8, such that a displacement of one with respect to the other is prevented.

The non-block assembly 61 is shown in more detail in FIGS. 2*b* to 2*d*. It comprises a pin 63 coupled to the rotor 62 at one end, a damper 64 coupled to the pin 63 at its other end and a carrier 65 fixed to the lead screw 2. The pin 63 and the damper are coupled to the rotor 62 such that they allow for some axial displacement between the carrier 65 and the rotor 62. For example, the damper 64 may be slidably coupled to the pin 62.

The carrier 65 comprises a notch 66 in which the damper 64 is positioned. The notch 66 is dimensioned slightly larger than the damper 64. This allows for some relative movement between the damper 64 connected to the rotor 62 and the carrier 65 connected to the lead screw 2 in a circumferential direction. The circumferential direction may correspond to the circumferential direction of the lead screw 2. Thus, if the lead screw 2 or rather the valve it operates is blocked for some reason, the rotor 62 can initiate a rotational movement upon which the damper 64 hits the blocked lead screw's 2 carrier 65. The gap between the damper 64 and the carrier 65 makes it hence possible to unblock the lead screw 2.

The carrier 65 of the non-block assembly 61 may be press fit or shrink fit to the lead screw 2. This may be the only means for securing the non-block assembly 61 to the lead screw 2. The fit may be provided at an end of the non-block assembly 61, which faces away from the threaded portion 22 of the lead screw 2 and towards the bushing 7. If a press fit is described between components of the present invention, then alternative connections such as shrink fits may also be considered.

At least some of the presently described features of the rotor tube assembly make it possible to perform an easier assembly of its components. A method for assembling a rotor tube assembly may comprise the steps of

- assembling a bearing housing assembly 1;
- assembling a rotor sleeve assembly 6;
- inserting a lead screw 2 into the bearing housing assembly 1;
- coupling the lead screw 2 to the bearing housing assembly 1;
- inserting the lead screw 2 into the rotor sleeve assembly 6;
- coupling the rotor sleeve assembly 6 to the lead screw 2;
- positioning a bushing 7 into a rotor tube 8 or onto the lead screw 2; and
- inserting the lead screw 2 with the bearing housing assembly 1 and the rotor sleeve assembly 6 into the rotor tube 8.

The assembly of the bearing housing assembly 1 and the rotor sleeve assembly 6 may include the assembly of any components of these assemblies, as presently described.

The steps may be performed in a different order, if this is physically feasible. For example, the rotor sleeve assembly 6 may clearly be assembled before the bearing housing assembly 1. However, the lead screw 2 may only be first inserted into the bearing housing assembly 1 and then into the rotor sleeve assembly 6.

In the case, in which the bushing 7 is positioned onto the lead screw 2, the bushing 7 is then inserted into the rotor tube 8 together with the other components connected to the lead screw 2. In the case, in which the bushing 7 is positioned into the rotor tube 8 first, the lead screw 2 is inserted into the bushing 7 at the same time as lead screw 2 is inserted into the rotor tube 8. The method may also comprise the step of connecting a lead nut 3 and a fixing member 4 to the lead screw 2.

The assembled rotor tube assembly may comprise any combination of the features described above. Of particular relevance may be features which enable or facilitate the assembly of the rotor tube assembly, in particular in the order given above.

As shown in FIGS. 3*a*-3*d*, the rotor tube assembly may be completed by the connection of the nut 3 and fixing member 4 to the lead screw 2 shown in previous figures. The assembly may be inserted into an assembly stator 100 with stationary permanent magnets. The permanent magnets hold the rotatable parts such as the lead screw 2 of the assembly in a fixed position, such that the nut 3 may be screwed to it.

Figures 3A, 3B, 3C, 3D:
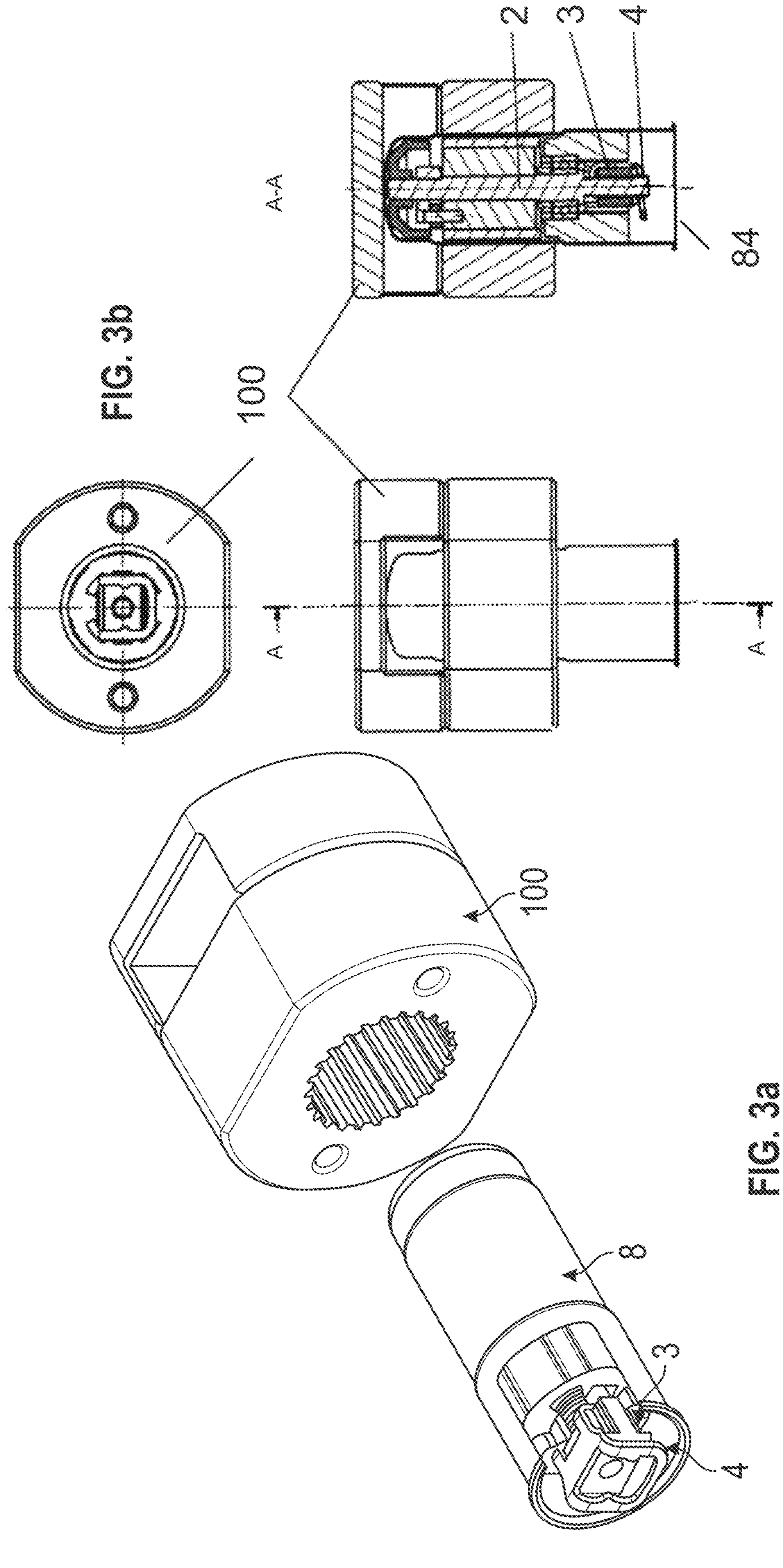
FIGS. 3*a*-3*d*: different views of the rotor tube assembly during assembly.

FIG. 3*a* shows an exploded view of the tube 8 and the assembly stator 100, wherein the rotor tube assembly is oriented towards an opening of the assembly stator 100. The nut 3 and the fixing member 4 are shown partially exposed and may be disconnected from the lead screw in this position.

FIGS. 3*b* to 3*d* show the rotor tube assembly during its assembly. inserted in the assembly stator 100. As shown in FIG. 3*d*, the nut 3 and in particular the fixing member 4 connected to the lead screw 2, oriented towards the opening 84 and a ready to engage a valve.

Figure 4:
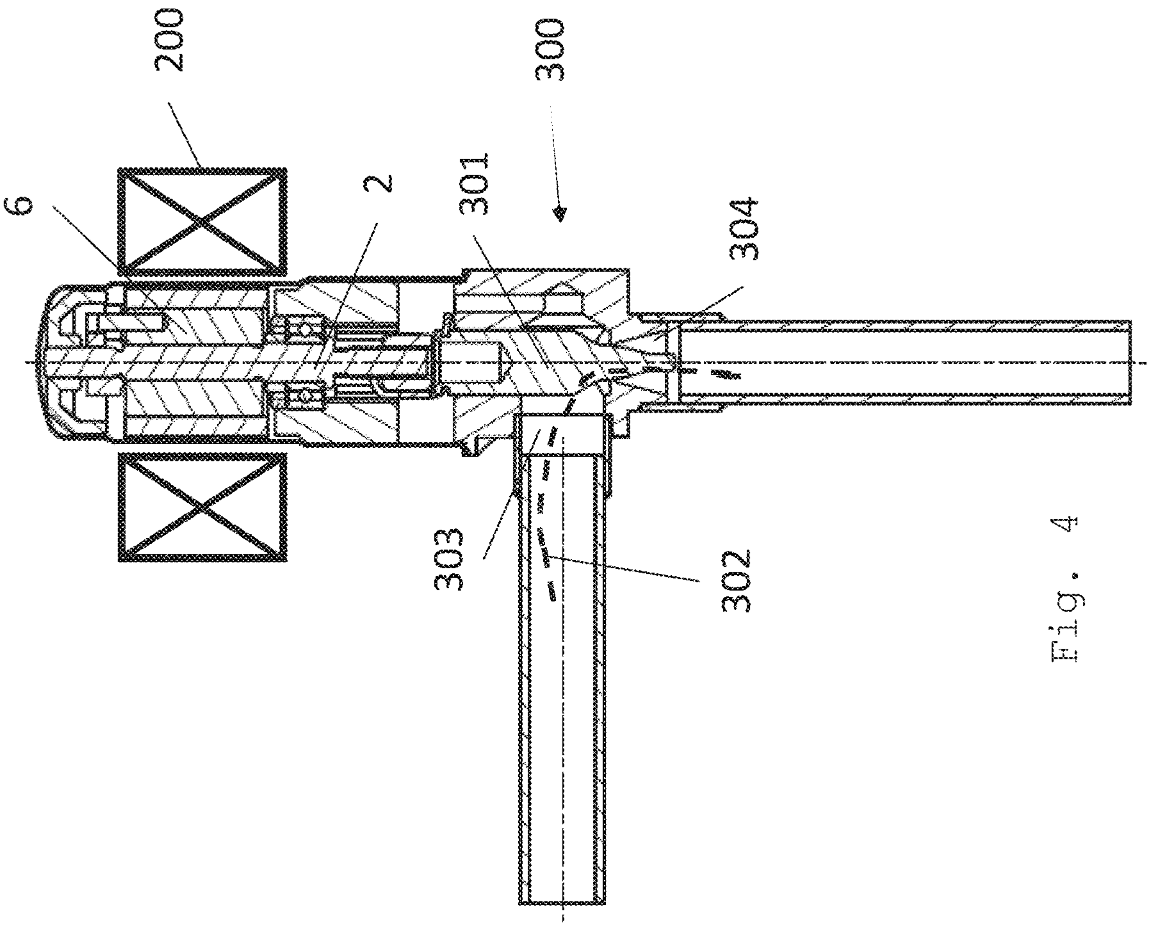
FIG. 4: sectional view of a valve with an actuator comprising the rotor tube assembly and a stator.

FIG. 4 is a sectional view of a valve with an actuator comprising the rotor tube assembly and a stator 200. The stator 200 is positioned close to the rotor sleeve assembly 6 for generating a rotational movement of the spindle 2. The spindle 2 engages a valve element 301 of a valve 300, such that a fluid passage 302 between two openings 303, 304 of the valve 300 can be opened and closed.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A rotor tube assembly for a fluid valve actuator, comprising a bearing housing assembly, a lead screw with a bottom shoulder, a rotor sleeve assembly with a non-block assembly, a bushing and a rotor tube, wherein the lead screw is provided at least partially inside the bearing housing assembly, the rotor sleeve assembly, the bushing and the rotor tube, wherein the bottom shoulder abuts the bearing housing assembly, wherein the lead screw comprises a bottom threaded portion on one side of the bottom shoulder and on the other side of the bottom shoulder and in this given order a bottom coupling portion for coupling the bearing housing assembly to the lead screw, a central coupling portion for coupling the rotor sleeve assembly to the lead screw, and an upper coupling portion for coupling the bushing to the lead screw, wherein the bottom shoulder has a larger outer diameter than the coupling portions, the bottom coupling portion has a larger outer diameter than or the same diameter as the central coupling portion and the upper coupling portion has a smaller diameter than or the same diameter as the bottom coupling portion and the central coupling portion.

2. The rotor tube assembly according to claim 1, wherein a guiding portion between the bottom coupling portion and the central coupling portion is provided for guiding the rotor sleeve assembly.

3. The rotor tube assembly according to claim 2, wherein the lead screw is in contact with the rotor tube only via the bushing and the bearing housing assembly and/or that the bearing housing assembly is fixed to the lead screw by means of an inner stopper.

4. The rotor tube assembly according to claim 3, wherein the bearing housing assembly is fixed to the lead screw by means of an inner stopper press fit to the lead screw.

5. The rotor tube assembly according to claim 2, wherein the bottom shoulder is the widest portion of the lead screw and/or that the rotor sleeve assembly is coupled to the lead screw via the non-block assembly.

6. The rotor tube assembly according to claim 5, wherein the non-block assembly is oriented away from the bearing housing assembly and towards the bushing.

7. The rotor tube assembly according to claim 2, wherein non-block assembly is press fit to the lead screw.

8. The rotor tube assembly according to claim 2, wherein a central shoulder is provided between the bottom coupling portion and the guiding portion and/or an upper shoulder is provided between the guiding portion and the central coupling portion.

9. The rotor tube assembly according to claim 1, wherein the lead screw is in contact with the rotor tube only via the bushing and the bearing housing assembly and/or that the bearing housing assembly is fixed to the lead screw by means of an inner stopper.

10. The rotor tube assembly according to claim 9, wherein the bottom shoulder is the widest portion of the lead screw and/or that the rotor sleeve assembly is coupled to the lead screw via the non-block assembly.

11. The rotor tube assembly according to claim 10, wherein the non-block assembly is oriented away from the bearing housing assembly and towards the bushing.

12. The rotor tube assembly according to claim 9, wherein non-block assembly is press fit to the lead screw.

13. The rotor tube assembly according to claim 1, wherein the bottom shoulder is the widest portion of the lead screw and/or that the rotor sleeve assembly is coupled to the lead screw via the non-block assembly.

14. The rotor tube assembly according to claim 13, wherein non-block assembly is press fit to the lead screw.

15. The rotor tube assembly according to claim 13, wherein the non-block assembly is oriented away from the bearing housing assembly and towards the bushing.

16. The rotor tube assembly according to claim 1, wherein non-block assembly is press fit to the lead screw.

17. The rotor tube assembly according to claim 1, wherein the bearing housing assembly comprises a bearing housing, a bearing, an outer stopper and axial grooves for inserting a lead nut and/or that a lead nut and a fixing member are provided for connecting the lead screw to a fluid valve.

18. The rotor tube assembly according to claim 17, wherein the bearing housing comprises radially outward pointing protrusions and/or two portions of different outer diameters.

19. The rotor tube assembly according to claim 1, wherein the rotor tube comprises an opening and three axially spaced apart portions of decreasing internal diameters, wherein the bushing is inserted into the innermost portion of the smallest diameter and furthest away from the opening and/or the bearing housing assembly is inserted at least partially into the outermost portion of the largest diameter and closest to the opening.

20. The rotor tube assembly according to claim 1, wherein the bushing and/or the bearing housing assembly comprise chamfered leading edges for facilitating their insertion into the rotor tube and/or that the non-block assembly is provided at least partially within the bushing.

21. The rotor tube assembly according to claim 1, wherein the bearing housing assembly is fixed to the lead screw by means of an inner stopper press fit to the lead screw.

* * * * *